US007969561B2

(12) United States Patent
Yang et al.

(10) Patent No.: US 7,969,561 B2
(45) Date of Patent: Jun. 28, 2011

(54) APPARATUS AND METHOD FOR MONITORING EXTINCTION RATIO OF OPTICAL SIGNALS

(75) Inventors: Chun-Liang Yang, Taipei (TW); Dar-Zu Hsn, Tainua (TW)

(73) Assignee: Industrial Technology Research Institute, Hsinchu (TW)

( * ) Notice: Subject to any disclaimer, the term of this patent is extended or adjusted under 35 U.S.C. 154(b) by 339 days.

(21) Appl. No.: 12/420,820

(22) Filed: Apr. 8, 2009

(65) Prior Publication Data

US 2010/0149521 A1 Jun. 17, 2010

(30) Foreign Application Priority Data

Dec. 17, 2008 (TW) .................... 97149142 A (51) Int. Cl.
*G01N 21/00* (2006.01)
(52) U.S. Cl. ...................................... 356/73.1
(58) Field of Classification Search .................. None
See application file for complete search history.

(56) References Cited

U.S. PATENT DOCUMENTS

| 5,535,038 | A | | 7/1996 | Hinch | |
|---|---|---|---|---|---|
| 5,978,129 | A | * | 11/1999 | Jourdan et al. | 359/326 |
| 6,643,040 | B2 | * | 11/2003 | Shen et al. | 359/107 |
| 2007/0109533 | A1 | | 5/2007 | Lee et al. | |
| 2007/0286609 | A1 | * | 12/2007 | Ikram et al. | 398/197 |

FOREIGN PATENT DOCUMENTS

TW  I267632  12/2006

OTHER PUBLICATIONS

High-Speed digital Transmitter Characterization Using Eye Diagram Analysis, by Christopher M. Miller, Aug. 1994 Hewlett-Packard Journal, p. 29~p. 37.
S. Mohrdiek, H. Burkhard, F. Steinhagen, H. Hillmer, R. Lösch, W. Schlapp, and R. Göbel, "10-Gb/s standard fiber transmission using directly modulated 1.55-•mquantum-well DFB lasers," IEEE Photonics Technology Letters, vol. 7, No. 11, pp. 1357-1359, Nov. 1995.
John D. Downie, Ioannis Tomkos, Neophytos Antoniades, and Aleksandra Boskovic, "Effects of filter concatenation for directly modulated transmission lasers at 2.5 and 10 Gb/s," IEEE Journal of Lightwave Technology, vol. 20, No. 2, pp. 218-228, Feb. 2002.
K. Hinton and T. Stephens, "Modeling high-speed optical transmission systems," IEEE J. Select. Areas Commun., vol. 11, pp. 380-392, Apr. 1993.
M. Fujiwara, H. Suzuki, N. Yoshimoto, K. Iwatsuki and T. Imai, "Multiwavelength monitoring by dithering temperature of directly-modulated laser diodes," Electronics Letters, vol. 42, No. 13, Jun. 22, 2006.
Dennis Derickson et al., Fiber Optic Test and Measurement, New Jersey, Prentice Hall, pp. 304-323, chap. 8.

* cited by examiner

*Primary Examiner* — Tu T Nguyen (57) ABSTRACT

An apparatus for monitoring extinction ratio (ER) of optical signals comprises an optical spectrum analyzing unit, an ER monitoring control unit and an ER monitoring output unit. The optical spectrum analyzing unit measures two peak values corresponding to level one and level zero of optical signals from an optical coupler, and obtains two wavelengths for the two peak values. The ER monitoring output unit outputs the difference of the two wavelengths to the ER monitoring control unit. With a relation formula of the wavelength difference, the ER monitoring control unit estimates an optimal resolution bandwidth for setting up the optical spectrum analyzing unit. As such, the optical spectrum analyzing unit measures two optical powers corresponding to level one and level zero of optical signals. With the two optical powers, the ER monitoring output unit computes an ER value.

21 Claims, 12 Drawing Sheets

APPARATUS AND METHOD FOR MONITORING EXTINCTION RATIO OF OPTICAL SIGNALS

FIELD OF THE INVENTION

The present invention generally relates to an apparatus and method for monitoring extinction ratio (ER) of optical signals.

BACKGROUND OF THE INVENTION

The optical spectrum analyzer (OSA) built-in to the optical network node usually has the capability of monitoring the parameters, such as, optical power, optical wavelength, optical path loss, optical signal to noise ratio (OSNR), and so on. The currently available techniques usually use digital communication analyzer (DCA) to observe the eye diagram of the optical signal to analyze the related parameters of the optical signal, such as, the ER value of the optical signal. The eye diagram is reconstructed by sequential sampling in the pseudorandom bit sequence (PRBS).

Figure 1:
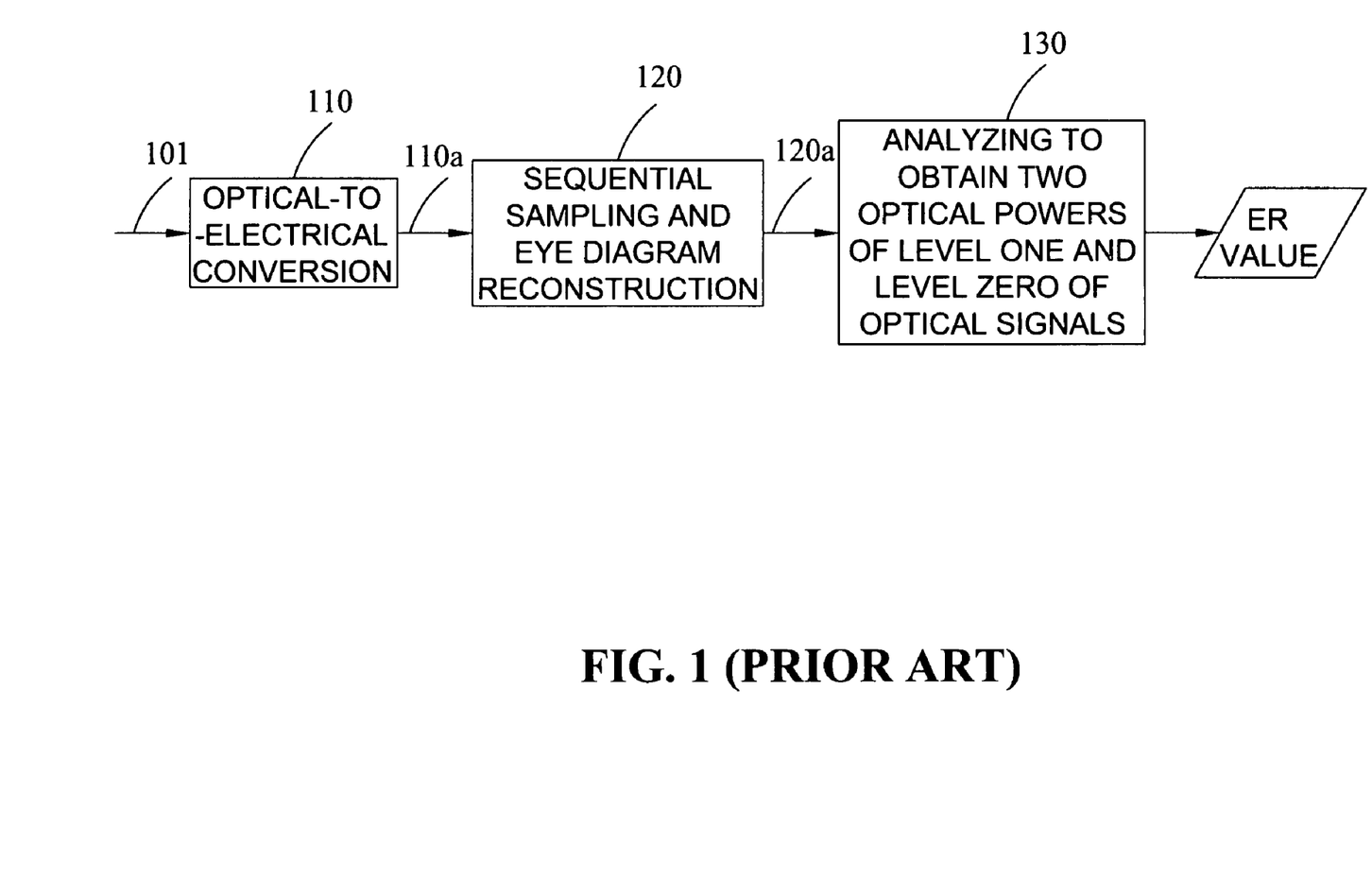
FIG. 1 shows an exemplary flowchart of a conventional method for computing ER value of the optical signal.

FIG. 1 shows an exemplary flowchart of a conventional method for computing ER value of the optical signal. As shown in FIG. 1, received optical signal 101 is converted to an electric pulse signal 110a through an optical-to-electrical conversion 110, which passes sequential sampling and eye diagram reconstruction 120 to become corresponding eye diagram 120a. Finally, eye diagram 120a is analyzed to obtain two optical powers 130 corresponding to level one and level zero of optical signal, and to obtain ER value.

Christopher M. Miller et. al. disclosed, in 1994, the use of eye diagram analyzer to execute the configuration of optical signal related parameters for digital transmission system, where the optical signal ER value is computed as:

$$\text{Extinction ratio (dB)} = 10 \cdot \log_{10}\left[\frac{\text{One level}}{\text{Zero level}}\right]$$

The locations of the two average optical powers $P_1$ and $P_0$ corresponding to bit one and bit zero of optical signal are determined by the peak value of the histogram, and the locations of the peak values are the locations of level one and level zero.

Figure 2:
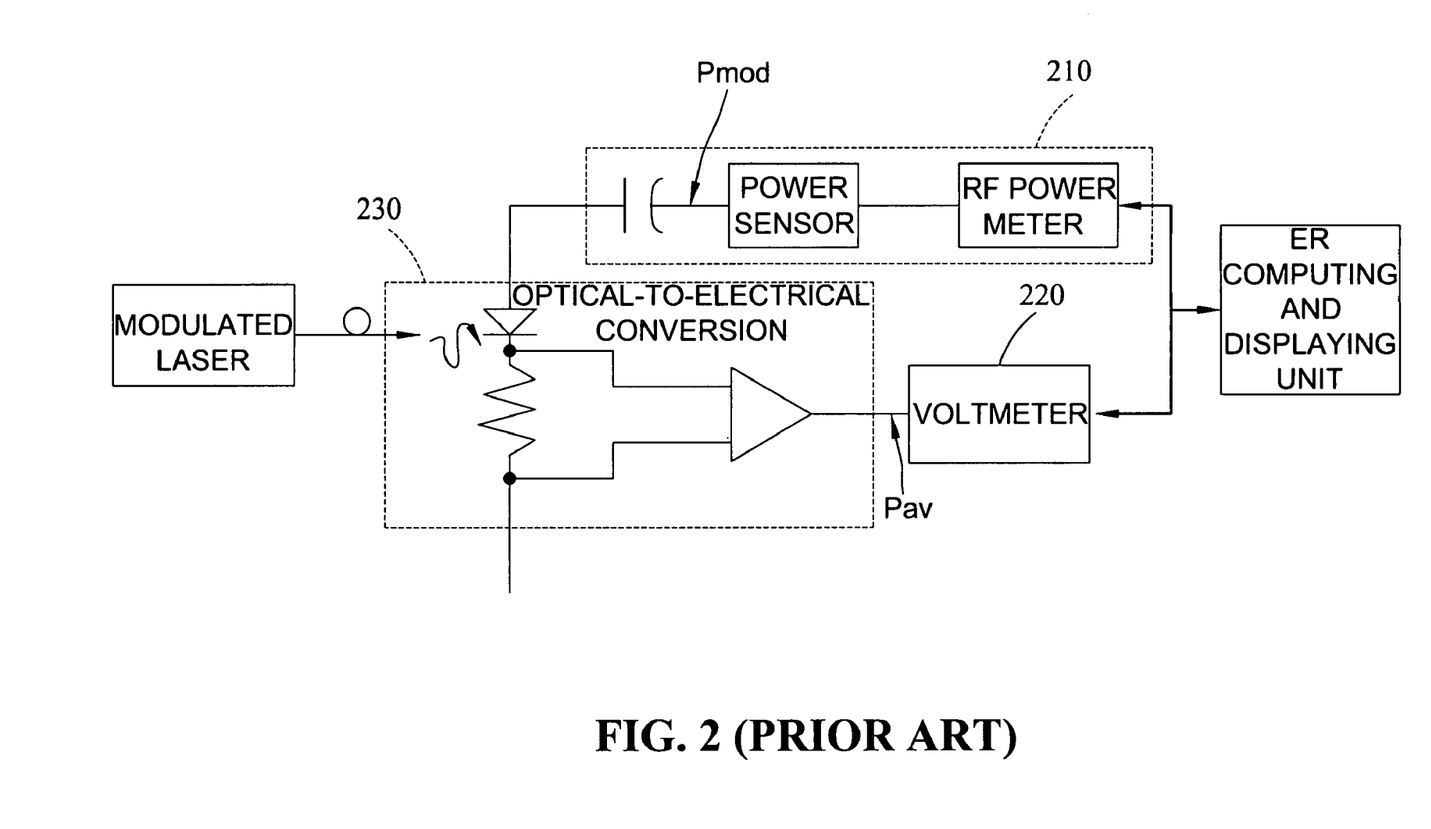
FIG. 2 shows an exemplary schematic view of an apparatus for determining ER value by directly measuring power.

U.S. Pat. No. 5,535,038 disclosed an apparatus and method for determining the ER by direct measurement of power. As shown in FIG. 2, means for measuring power 210 is used to measure the power $P_{mod}$ of modulated signal. Take voltmeter (equivalent to measuring optical power) 220 as example to measure the average optical power $P_{av}$. The following equation is used to determine ER value:

$$ER = \frac{P_{av} + P_{mod}}{P_{av} - P_{mod}}$$

The apparatus needs optical-to-electrical conversion 230 to convert the optical signal to electric signal.

Figure 3:
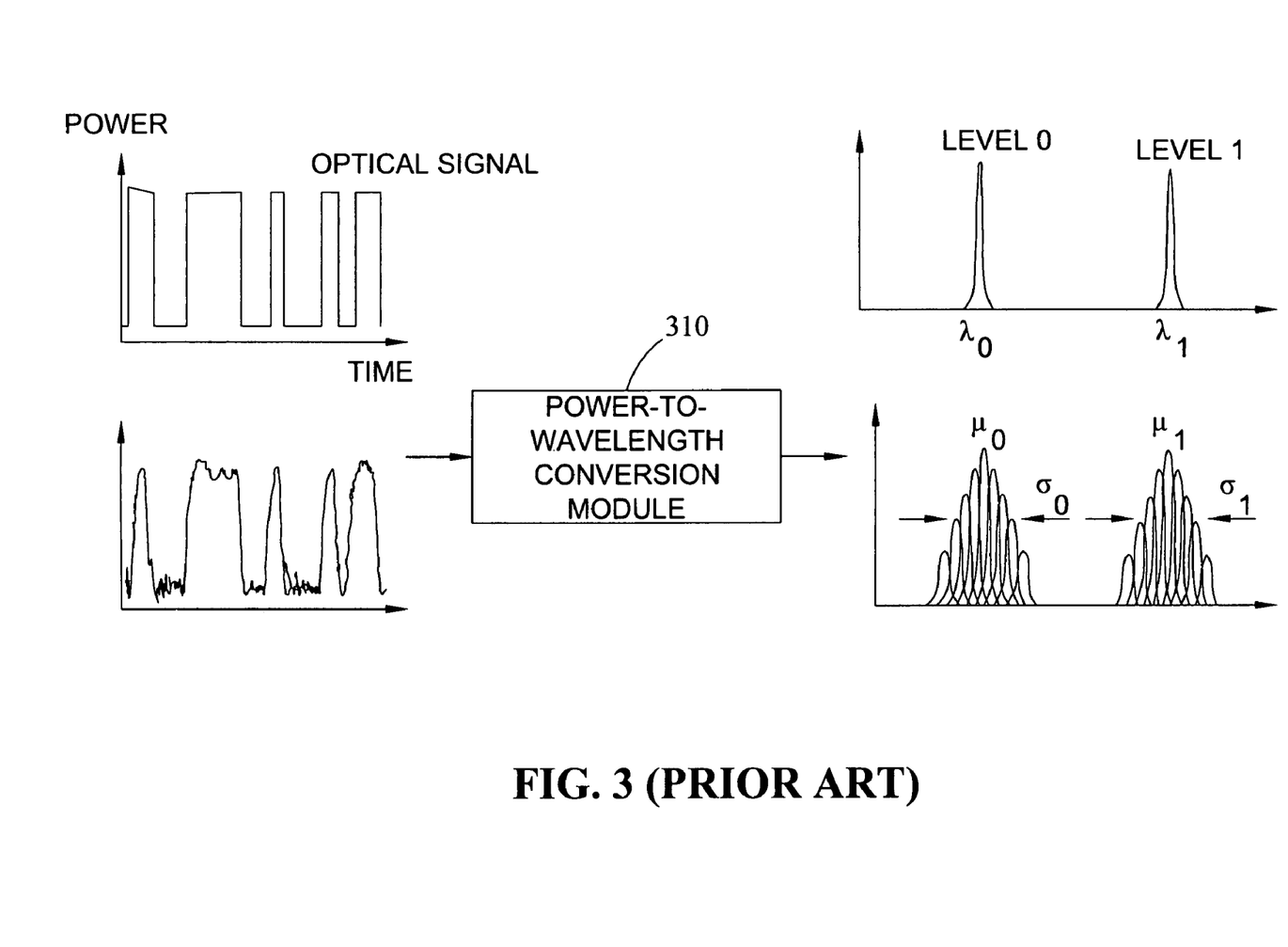
FIG. 3 shows an exemplary schematic view of converting the optical signal power waveform into the optical wavelength waveform.

U.S. Patent Publication No. 2007/0109533 disclosed a non-sampling-based Q-factor measuring apparatus and method. As shown in FIG. 3, this technique uses an optical signal domain conversion module to convert the optical signal power waveform to be monitored into signal format of other domains, such as, using a power-to-wavelength conversion module 310 to convert into the optical wavelength waveform. When the optical signal is converted from the optical power waveform into optical wavelength waveform, the Q-factor of the optical signal in the optical wavelength domain is defined as:

$$Q \equiv \frac{\mu_1(\text{nm}) - \mu_0(\text{nm})}{\sigma_1(\text{nm}) + \sigma_0(\text{nm})}$$

where $\mu_1(\text{nm})$, $\mu_0(\text{nm})$ are the average wavelengths of the level one and level zero of optical signal respectively, and $\sigma_1(\text{nm})$ and $\sigma_0(\text{nm})$ are the wavelength standard deviations of the level one and level zero of optical signal respectively.

The aforementioned techniques must collaborate with the optical filter to process wavelength division multiplexing (WDM) multichannel optical signal.

Figure 4:
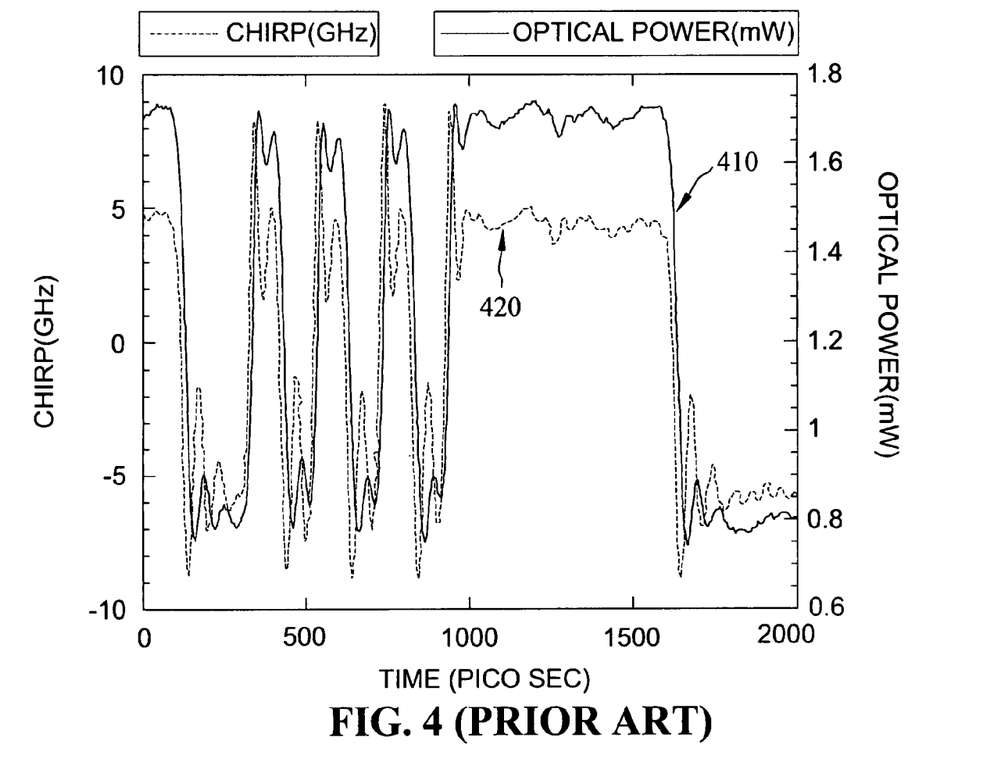
FIG. 4 shows an exemplary schematic view of an output optical power waveform and a chirp waveform for a single wavelength DML.

As shown in FIG. 4, in time domain, after the optical signal is transmitted by optical fiber, the output optical power waveform 410 (the solid line) and the chirp waveform 420 (the dash line) of the single wavelength directly modulated laser (DML) show high degree of resemblance. Optical signal level one and level zero have different optical frequency offset, that is, the chirp effect. Therefore, it is necessary to use an optical spectrum analyzing unit, such as, optical spectrum analyzer, to monitor the ER value of optical signals in the optical domain.

SUMMARY OF THE INVENTION

The exemplary embodiments of the present invention may provide an apparatus and method for monitoring ER value of optical signals.

In an exemplary embodiment, the disclosed relates to an apparatus for monitoring the ER value of optical signals, comprising an optical spectrum analyzing unit, an ER monitoring control unit and an ER monitoring output unit. The optical spectrum analyzing unit measures two peak values corresponding to level one and level zero of optical signals from an optical coupler, and obtains two wavelengths for the two peak values. The ER monitoring output unit outputs the difference of the two wavelengths, i.e., $\Delta\lambda_{p-p(real)}$ to the ER monitoring control unit. The ER monitoring control unit is connected to the optical spectrum analyzing unit and the ER monitoring output unit, respectively. According to the wavelength difference, the ER monitoring control unit estimates an optimal resolution bandwidth (RBW) for setting up the optical spectrum analyzing unit. As such, the optical spectrum analyzing unit measures two optical powers $P_1$ and $P_0$ corresponding to level one and level zero of optical signals. With the two optical powers $P_1$ and $P_0$, the ER monitoring output unit computes an ER value.

In another exemplary embodiment, the disclosed relates to a method for monitoring ER of optical signals, comprising: using an optical spectrum analyzing unit to measure the wavelength difference of two peak values corresponding to level one and level zero of optical signals; according to the wavelength difference, estimating an optimal resolution bandwidth (RBW); using the optical spectrum analyzing unit with the optimal RBW to measure two optical powers $P_1$ and $P_0$ corresponding to level one and level zero of optical signals; and computing the ER value of the optical signal using the two optical powers $P_1$ and $P_0$.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

Under the drive of the directly modulated laser (DML), the output waveform of optical signal will includes a peak and a second peak. The difference between the two peaks (i.e., the wavelength difference) is the adiabatic chirp. As aforementioned, the optical power waveform output by DML under the chirp effect is similar to the waveform of the chirp waveform. Therefore, the level 1 and level zero have different optical frequency (optical wavelength). The key technique of the present invention is how to use the optical spectrum analysis to monitor the ER of optical signals. From the optical spectrum analysis, the peak signal of the short wavelength is level one, with average optical power $P_1$, and the peak signal of the long wavelength is level zero, with average optical power $P_0$. $P_1(dBm)$ and $P_0(dBm)$ may be read directly from the optical spectrum analyzer. With these two optical powers (dBm), the ER value (dB) of the optical signal may be computed.

DML has the relation between output optical power P(t) and chirp $\Delta v(t)$ as follows:

$$\Delta v(t) = \frac{\alpha}{4\pi}\left(\frac{d}{dt}[\ln(P(t))] + kP(t)\right)$$

where $\alpha$ is the line-width enhancement factor and $\kappa$ is adiabatic chirp coefficient.

Figure 5:
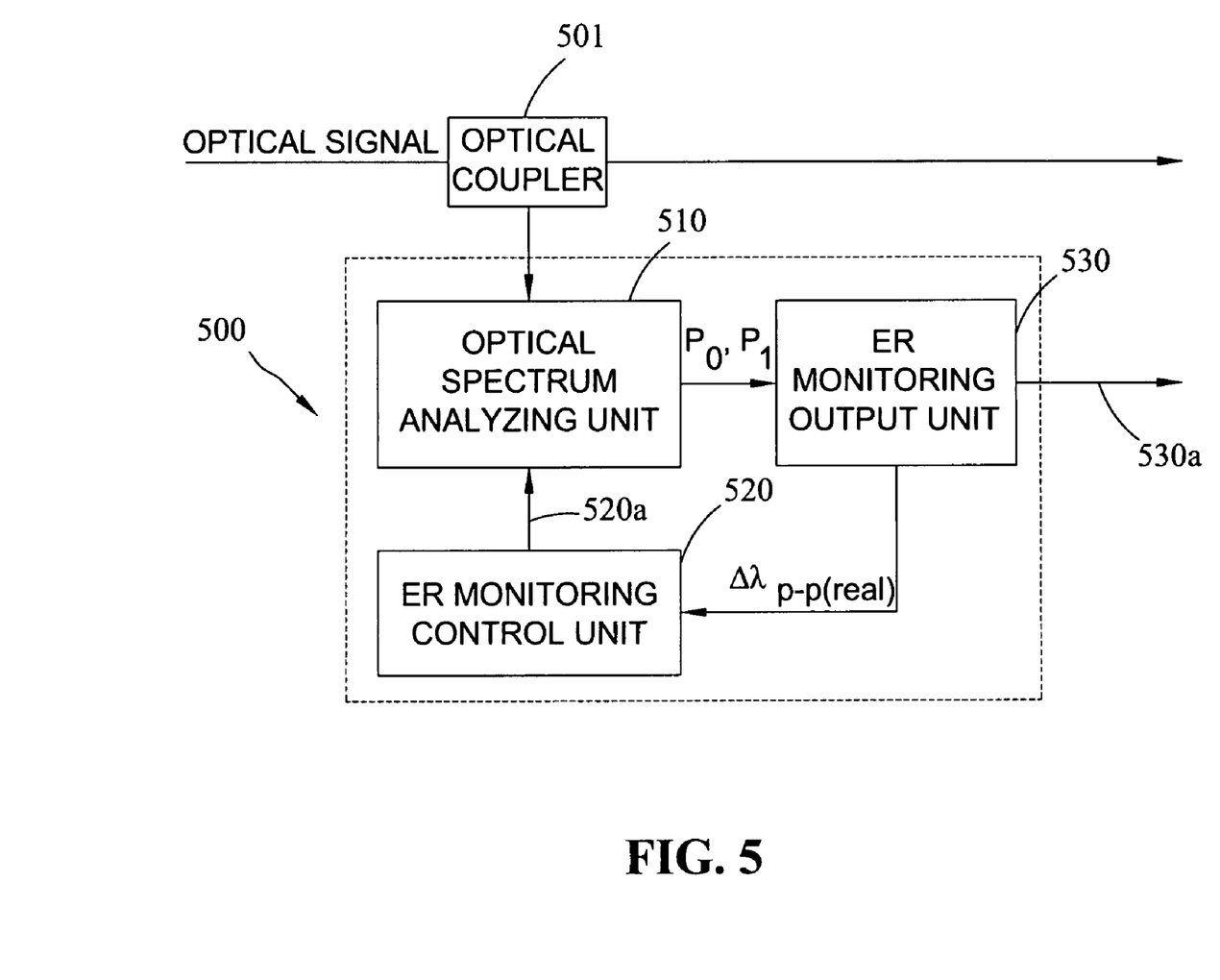
FIG. 5 shows an exemplary schematic view of an embodiment of the apparatus for monitoring ER of optical signals, consistent with certain disclosed embodiments of the present invention.

FIG. 5 shows an exemplary schematic view of an embodiment of the apparatus for monitoring ER of optical signals, consistent with certain disclosed embodiments of the present invention. Referring to FIG. 5, apparatus 500 for monitoring ER of optical signals comprises an optical spectrum analyzing unit 510, an ER monitoring control unit 520 and an ER monitoring output unit 530.

Optical spectrum analyzing unit 510 measures two peak values corresponding to level one and level zero of optical signals from an optical coupler 501, and obtains two wavelengths for the two peak values. For example, the two peak values can be measured according to a default value of a RBW. ER monitoring output unit 530 outputs the difference of the two wavelengths, i.e., $\Delta\lambda_{p\text{-}p(real)}$ to ER monitoring control unit 520. ER monitoring control unit 520 is connected to optical spectrum analyzing unit 510 and ER monitoring output unit 530, respectively. With a relation of wavelength difference $\Delta\lambda_{p\text{-}p(real)}$, an optimal resolution bandwidth (RBW) 520a is estimated for setting up optical spectrum analyzing unit 510. As such, optical spectrum analyzing unit 510 has the optimal RBW setting and measures two optical powers $P_1$ and $P_0$ corresponding to level one and level zero of optical signals to provide ER monitoring output unit 530. With two optical powers $P_1$ and $P_0$, ER monitoring output unit 530 computes an ER value 530a.

Figure 6:
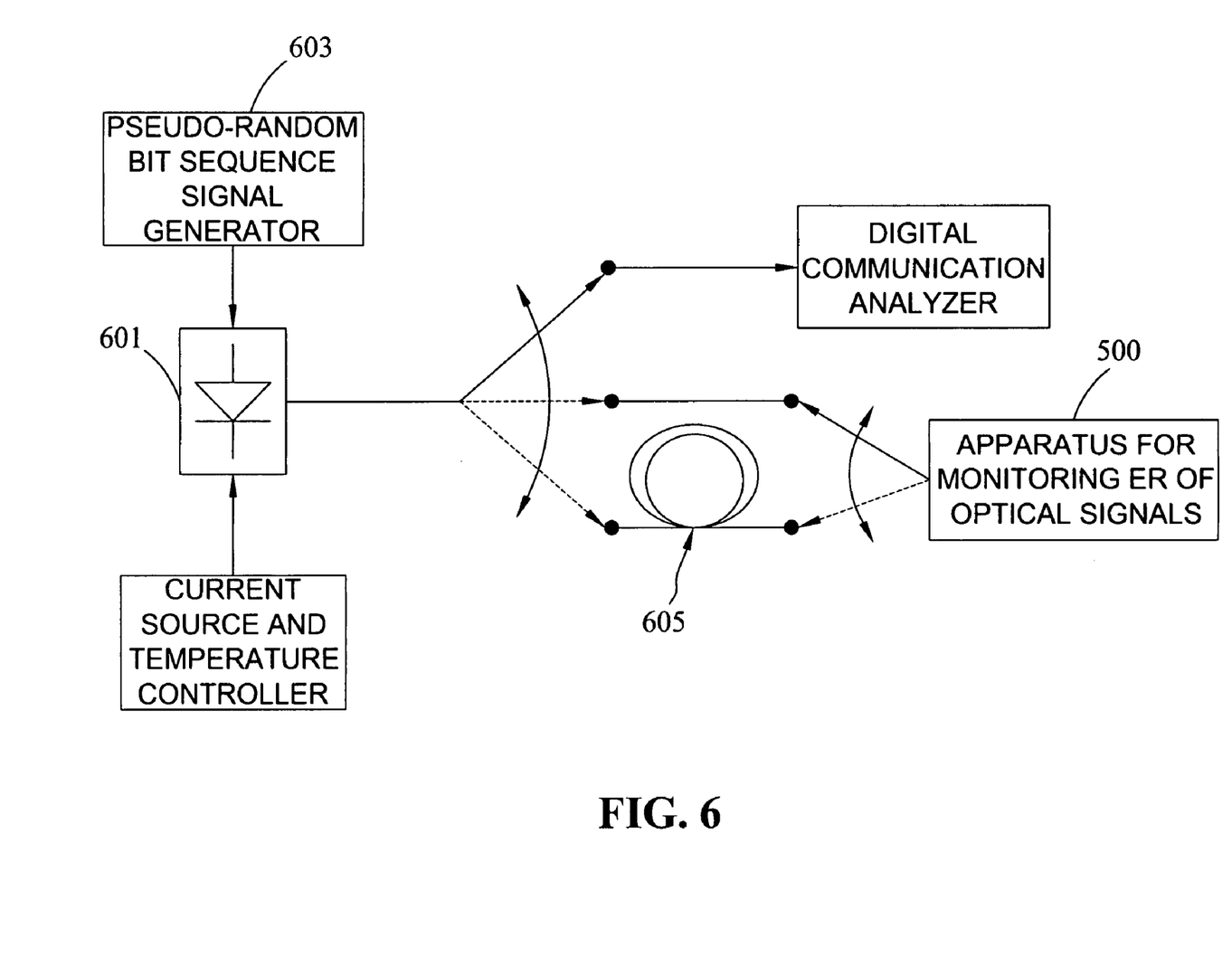
FIG. 6 shows an exemplary schematic view of an application of FIG. 5 in an experimental environment, consistent with certain disclosed embodiments of the present invention.

FIG. 6 shows an exemplary schematic view of an application of apparatus 500 in an experimental environment, consistent with certain disclosed embodiments of the present invention. The experimental environment has the following setup: using directly modulated distributed feedback (DFB) laser 601 as laser source, the pseudo-random bit sequence (PRBS) length of PRBS signal generator 603 being $2^7-1$, in other words, PRBS signal generator being able to generate $2^7-1$ cyclic bits, and data rate being 2.5 Gbps and 10 Gbps, respectively. Directly modulated signal current is 40 mA, the initial value of the RBW of the optical spectrum analyzer is 0.06 nm.

In this experimental environment, the transmission end of optical signal generally uses a single wavelength DML to carry the data signal. The modulated optical signal will be accompanied by the chirp characteristic so that the optical spectrum of optical signal level one and level zero will be separate in the optical spectrum analysis to enable the computation of the ER value.

In addition to the multichannel monitoring capability, the embodiments of the present invention may also be used to perform remote optical signal source monitoring after the optical signal is transmitted by optical fiber. For example, marked as 605, after the optical signal is transmitted 25 km by a single mode fiber (SMF), apparatus 500 for monitoring ER of optical signals of the present invention is used to monitor the ER of remote optical source, which is 3.3 dB.

Figure 7:
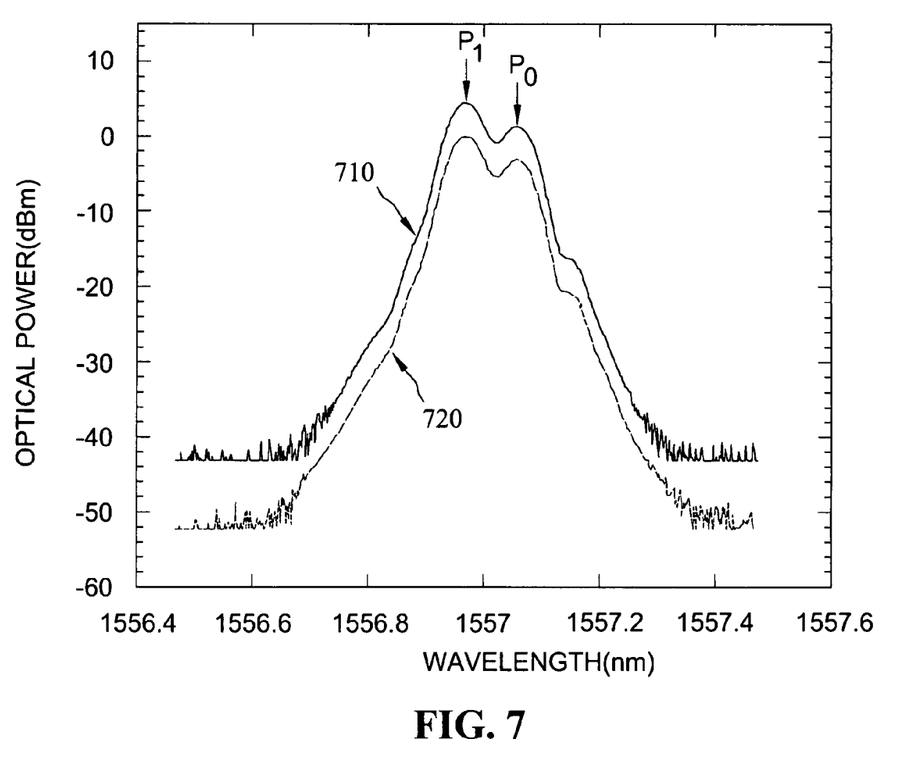
FIG. 7 shows optical spectrum of directly modulated DFB laser at data rate of 2.5 Gbps, and optical spectrum after transmitted 25 km by SMF, respectively, in the experimental environment, consistent with certain disclosed embodiments of the present invention.

FIG. 7 shows optical spectrum 710 of directly modulated DBF laser after the optical signal is transmitted at 2.5 Gbps data rate by an optical fiber, and optical spectrum 720 after transmitted 25 km by a SMF, respectively, in the experimental environment, consistent with certain disclosed embodiments of the present invention. As aforementioned chirp effect in the time domain, the optical power waveform and the chirp waveform have high degree of resemblance. Although the overall optical spectrum average power decreases because of the optical transmission decay, FIG. 7 shows that the optical spectrum profile remains unchanged in the wavelength domain. Therefore, apparatus 500 for monitoring ER of optical signals of the present invention may be used to monitor the ER value of remote optical signal source.

Apparatus 500 for monitoring ER of optical signals may be also built into the optical spectrum analyzer to integrate with the existing functions to monitor wavelength-division multiplexing (WDM) multichannel parameters, such as, optical wavelength, optical power, optical path loss, optical SNR (OSNR), ER, and so on, without expensive equipments, such as, the eye diagram analysis and ER computation from high-speed digital communication analyzer. ER monitoring output unit 530 may further include the computation of optical power, optical wavelength, $\Delta\lambda_{p\text{-}p(real)}$, ER of optical signals, and so on.

Optical spectrum analyzing unit 510 may be realized in various manners. For example, a set of adjustable RBW optical filters and photodiodes may be used to implement. Alternatively, two sets of adjustable RBW optical filters and photodiodes may be used, with a set of adjustable optical filter having RBW less than an nm-level default value, such as 0.01 nm, and the other set of adjustable optical filters having RBW equal to multiple of the default value. Or, a diffraction grating filter and a photodiode array may also be used to realize the optical spectrum analyzing unit. For a single optical channel signal, if $\Delta\lambda_{p\text{-}p(real)}$ is known and has a fixed value, the optical spectrum analyzing unit may be simplified as a set of optical filters with fixed RBW setting and level one and level zero being able to be filtered separately, and required photodiodes.

In general, the wavelengths of the peaks corresponding to level one and level zero will not maintain at a fixed value, instead, the wavelengths will change when optical power changes. Therefore, a filter with sufficient RBW is generally used to measure both the optical powers of level one and level zero to obtain the correct average. When the optical wavelength difference between the peaks corresponding to level one and level zero is large, the higher RBW may be set to accurately obtain the average optical powers. However, when the optical wavelength difference between the peaks corresponding to level one and level zero is small, the same RBW cannot be used. This is because the level one optical power may be included when measuring level zero optical power due to an overly large BRW, which results in an underestimated ER value, as shown in FIG. 8.

Figure 8:
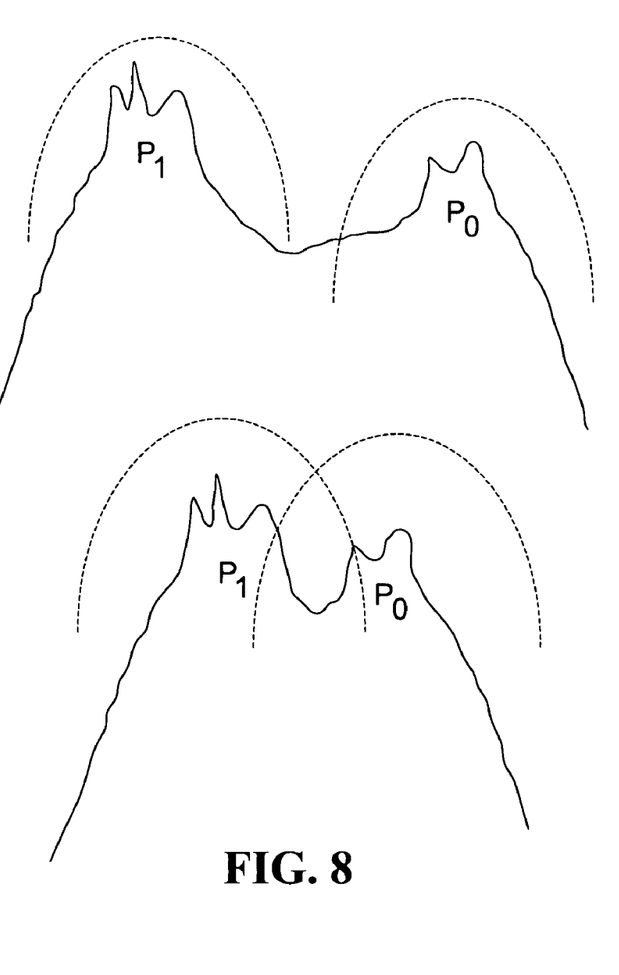
FIG. 8 shows an exemplary schematic view of the optical spectrum under the influence of chirp effect and the optical spectrum measured by an optical spectrum analyzer using the same RBW, consistent with certain disclosed embodiments of the present invention.

As shown in the upper part of FIG. 8, when the optical wavelength difference between the peaks corresponding to level one and level zero is large, the optical spectrum analyzer is set to a higher RBW to accurately obtain the optical powers $P_1$ and $P_0$ of level one and level zero of optical signal. The lower part of FIG. 8 shows that the optical spectrum analyzer using the same RBW results in the inclusion of level one optical power $P_1$ when measuring level zero optical power $P_0$. Therefore, the optimal RBW must be obtained according to different $\Delta\lambda_{p\text{-}p(real)}$. In other words, the optimal RBW is related to wavelength difference $\Delta\lambda_{p\text{-}p(real)}$ of the peaks corresponding to level one and level zero of the optical signal.

Figure 9:
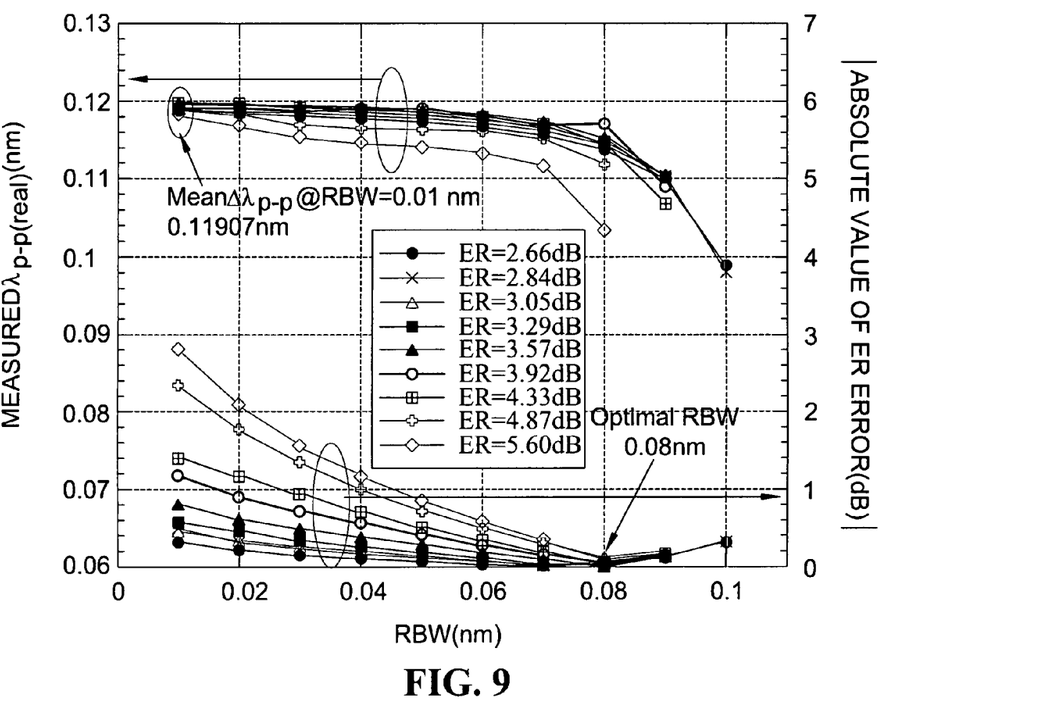
FIG. 9 shows a schematic view of the relation among measured $\Delta\lambda_{p\text{-}p(real)}$, ER error, and RBW, consistent with certain disclosed embodiments of the present invention.

To enable optical spectrum analyzing unit 510 to accurately measure the correct optical power of the two peaks corresponding to level one and level zero of optical signal in order to compute ER value, the present invention find out the relation between the optimal RBW and $\Delta\lambda_{p\text{-}p(real)}$. FIG. 9 shows an exemplary schematic view of the relation among measured $\Delta\lambda_{p\text{-}p(real)}$, ER error, and RBW, consistent with certain disclosed embodiments of the present invention. As shown in FIG. 9, for each ER value, the $\Delta\lambda_{p\text{-}p(real)}$ measured using different RBW setting will converge at an average of 0.11907 nm when RBW=0.01 nm, and the minimum ER error occurs at RBW=0.08 nm. The smaller the ER value is, the less the monitored ER value is affected by the RBW value.

Figure 10:
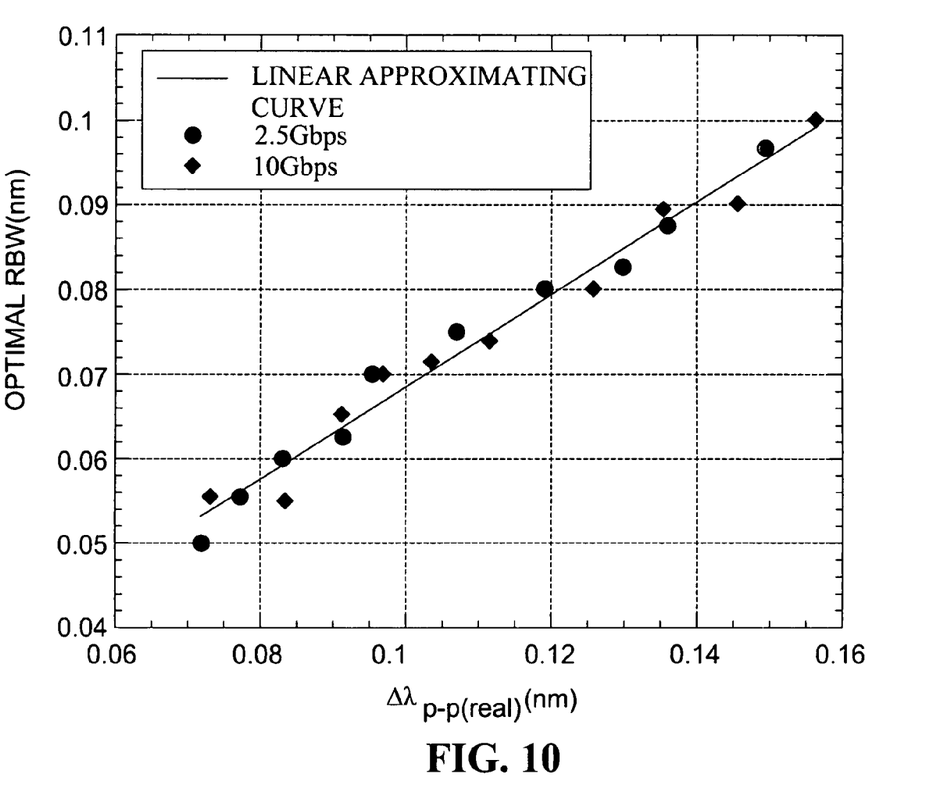
FIG. 10 shows a good linear relation existing between $\Delta\lambda_{p\text{-}p(real)}$ and the optimal RBW for different rate of directly modulated optical signal, consistent with certain disclosed embodiments of the present invention.

FIG. 10 shows a good linear relation existing between $\Delta\lambda_{p\text{-}p(real)}$ and the optimal RBW for different rate of directly modulated optical signal, consistent with certain disclosed embodiments of the present invention. In the exemplar of FIG. 10, the data points represented by circles and diamonds are the obtained optimal RBW according to different $\Delta\lambda_{p\text{-}p(real)}$ after the optical signals are transmitted at 2.5 Gbps and 10 Gbps data rate by an optical fiber, respectively. As seen in FIG. 10, $\Delta\lambda_{p\text{-}p(real)}$ and optimal RBW have a good linear relation. Therefore, when $\Delta\lambda_{p\text{-}p(real)}$ is known, the optimal RBW may be estimated with the linear relation of $\Delta\lambda_{p\text{-}p(real)}$. In other words, the optimal RBW is estimated as $\alpha+\beta\times\Delta\lambda_{p\text{-}p(real)}$, where $\alpha$ and $\beta$ are constants greater than 0. For example, in a simulation analysis result, a useful estimation formula is RBW=0.013979+0.54425×$\Delta\lambda_{p\text{-}p(real)}$. Hence, when $\Delta\lambda_{p\text{-}p(real)}$=0.088 nm, the estimated optimal RBW is close to 0.06 nm. The optimal RBW may be used to set optical spectrum analyzing unit 510.

Figure 11:
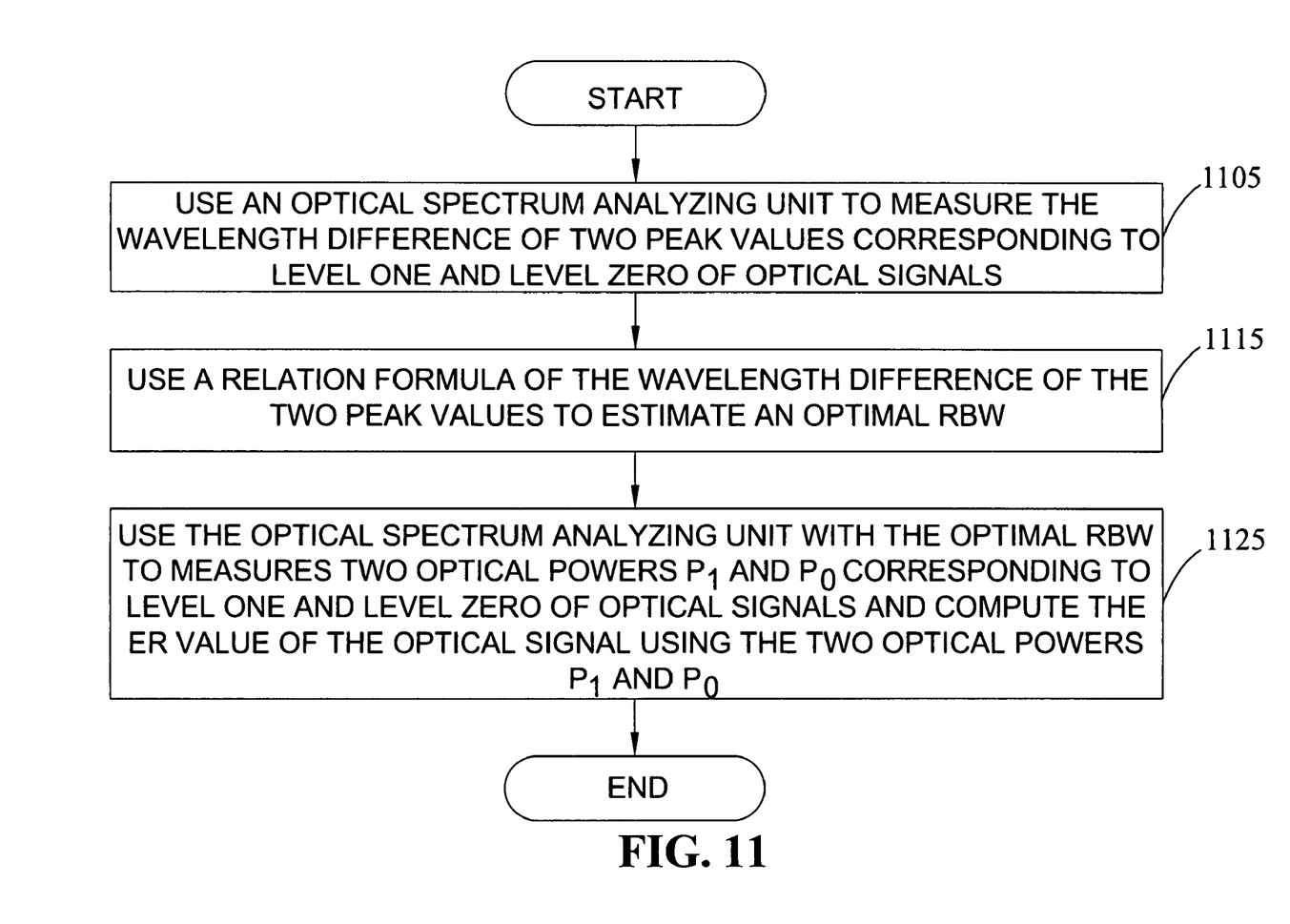
FIG. 11 shows an exemplary flowchart of a method for monitoring ER of optical signals, consistent with certain disclosed embodiments of the present invention.

FIG. 11 shows an exemplary flowchart of a method for monitoring ER of optical signals, consistent with certain disclosed embodiments of the present invention. Referring to the exemplary flowchart shown in FIG. 11, step 1105 is to use an optical spectrum analyzing unit to measure the wavelength difference of the two peak values corresponding to level one and level zero of optical signals. Step 1115 is to use a formula of the wavelength difference of the two peak values to estimate an optimal RBW. Step 1125 is to use the optical spectrum analyzing unit with the optimal RBW to measures two optical powers $P_1$ and $P_0$ corresponding to level one and level zero of optical signals and compute the ER value of the optical signal using the two optical powers $P_1$ and $P_0$.

The flowchart may be executed on an optical spectrum analyzer. In step 1105, the RBW of the optical spectrum analyzer may be initially set to a default value, such as, a default value greater than 0 nm and less than or equal to 0.01 nm. If wavelength difference $\Delta\lambda_{p\text{-}p(real)}$ between two peak values is known, step 1105 may be omitted. In step 1115, as aforementioned, the optimal RBW setting may be obtained by using the linear relation of $\Delta\lambda_{p\text{-}p(real)}$ to estimate. In step 1125, the ER of the optical signal may be computed by either the ratio of $P_1$(mW) and $P_0$(mW), or the difference of $P_1$(dBm) and $P_0$(dBm). In other words, ER(dB) may be computed with one of the following two equations:

$$ER(dB)=10\times\log_{10}(P_1(mW)/P_0(mW))$$

$$ER(dB)=P_1(dBm)-P_0(dBm)$$

Figure 12:
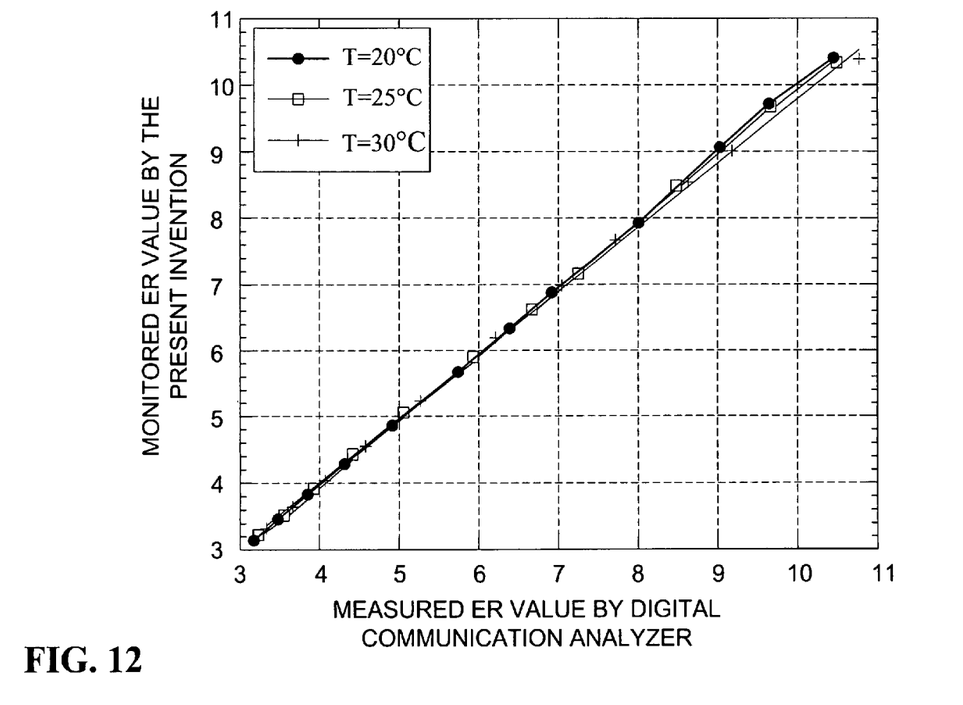
FIG. 12 shows an exemplar of the relation between the monitored ER by the present invention and the ER measured by digital communication analyzer under different laser operating temperatures, consistent with certain disclosed embodiments of the present invention.

FIG. 12 shows an exemplar of the relation between the monitored ER by the present invention and the ER measured by digital communication analyzer under different laser operating temperatures, such as, 20° C., 25° C., 30° C., consistent with certain disclosed embodiments of the present invention. As can be seen from FIG. 12, the ER directly monitored on OSA represented by vertical axis will not be affected by the laser operating temperature, and is almost identical with the ER measured by digital communication analyzer represented by the horizontal axis.

In summary, the exemplary embodiments of the present invention provide an apparatus and method for monitoring ER of optical signals. In addition to measuring ER of optical signals on OSA and providing accurate monitored ER of the optical signal, the present invention may also provide the capability of multi-wavelength channel wavelength monitoring and remote monitoring ER of optical signals, and is not affected by the laser operating temperature.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for monitoring extinction ratio (ER) of optical signals, comprising:
   an optical spectrum analyzing unit for measuring two peak values corresponding to level one and level zero of optical signals from an optical coupler, and obtaining two wavelengths for said two peak values;
   an ER monitoring output unit for outputting difference of the two said wavelengths of two said peak values; and
   an ER monitoring control unit connected to said optical spectrum analyzing unit and said ER monitoring output unit, respectively, and according to a relation formula of said wavelength difference, estimating an optimal resolution bandwidth (RBW);
   wherein according to said optimal RBW, said optical spectrum analyzing unit measures two optical powers corresponding to level one and level zero of optical signals, and said ER monitoring output unit computes an ER value according to said two optical powers.

2. The apparatus as claimed in claim 1, said apparatus is built into an optical spectrum analyzer.

3. The apparatus as claimed in claim 2, said apparatus is integrated with original functions of said optical spectrum analyzer to monitor wavelength-division multiplexing multichannel parameters.

4. The apparatus as claimed in claim 1, wherein said optimal RBW and said wavelength difference between said two peak values form a linear relation.

5. The apparatus as claimed in claim 1, wherein said optical spectrum analyzing unit is implemented with a set of adjustable RBW filters and photodiodes.

6. The apparatus as claimed in claim 1, wherein said optical spectrum analyzing unit is implemented with two sets of adjustable RBW optical filters and photodiodes, with a set of adjustable optical filter having RBW less than an nm-level default value, and the other set of adjustable optical filters having RBW equal to multiple of said default value.

7. The apparatus as claimed in claim 1, wherein said optical spectrum analyzing unit is implemented with a diffraction grating filter and a photodiode array.

8. The apparatus as claimed in claim 1, wherein for a single optical channel signal, if said wavelength difference of said two peak values is known and has a fixed value, said optical spectrum analyzing unit is implemented with a set of optical filters with fixed RBW setting and level one and level zero being able to be filtered separately, and required photodiodes.

9. The apparatus as claimed in claim 1, wherein said ER monitoring output unit further performs computation of optical power, optical wavelength, wavelength difference of two said peak values, and ER of optical signals.

10. The apparatus as claimed in claim 1, wherein said optical spectrum analyzing unit measures two said peak values according to default value of an RBW.

11. A method for monitoring extinction ratio (ER) of optical signals, comprising:
    using an optical spectrum analyzing unit to measure two wavelengths of two peak values corresponding to level one and level zero of optical signals;
    according to wavelength difference $\Delta\lambda_{p\text{-}p(real)}$ of said two wavelengths, estimating an optimal resolution bandwidth (RBW); and
    using said optical spectrum analyzing unit with said optimal RBW to measure two optical powers corresponding to level one and level zero of optical signals; and
    computing an ER value of said optical signal by referring to said two optical powers.

12. The method as claimed in claim 11, wherein said optimal RBW is estimated with following linear relation:
    said optimal RBW=$\alpha+\beta\times\Delta\lambda_{p\text{-}p(real)}$, where $\alpha$ and $\beta$ are constants greater than 0.

13. The method as claimed in claim 11, wherein said ER value of said optical signals is computed with the ratio of said two optical powers, and the unit for the two optical powers is mW.

14. The method as claimed in claim 11, wherein said ER value of said optical signals is computed with the difference of said two optical powers, and the unit for the two optical powers is dBm.

15. The method as claimed in claim 11, wherein said ER value of said optical signals is not affected by laser operating temperature.

16. The method as claimed in claim 11, said method obtains different optimal RBW according to wavelength different $\Delta\lambda_{p\text{-}p(real)}$.

17. The method as claimed in claim 11, wherein said method is integrated with original functions of said optical spectrum analyzer to monitor wavelength-division multiplexing multichannel parameters.

18. The method as claimed in claim 11, wherein if said wavelength difference $\Delta\lambda_{p\text{-}p(real)}$ is known, said method does not execute said step of using an optical spectrum analyzing unit to measure two wavelengths of two peak values corresponding to level one and level zero of optical signals.

19. The method as claimed in claim 11, said method is executed on an optical spectrum analyzer.

20. The method as claimed in claim 11, wherein said optical spectrum analyzing unit measures two said peak values according to a default value of RBW.

21. The method as claimed in claim 20, wherein said default value is greater than 0 nm and less than or equal to 0.01 nm.

* * * * *

UNITED STATES PATENT AND TRADEMARK OFFICE
CERTIFICATE OF CORRECTION

PATENT NO. : 7,969,561 B2  
APPLICATION NO. : 12/420820  
DATED : June 28, 2011  
INVENTOR(S) : Chun-Liang Yang and Dar-Zu Hsn Page 1 of 1

It is certified that error appears in the above-identified patent and that said Letters Patent is hereby corrected as shown below:

On the Title Pg
Item (75), Inventors: change "Dar-Zu Hsn, Tainua (TW)" to -- Dar-Zu Hsu, Tainan (TW) --

Signed and Sealed this
Eighteenth Day of October, 2011

David J. Kappos
*Director of the United States Patent and Trademark Office*